Figure 5:
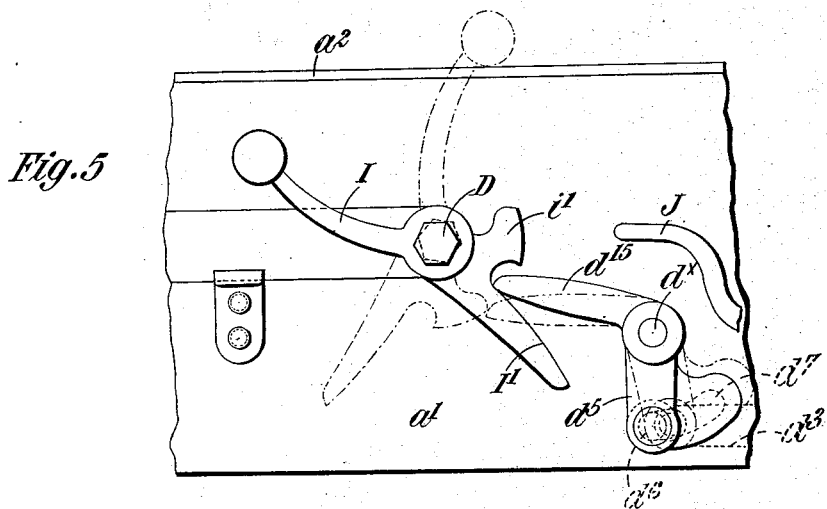

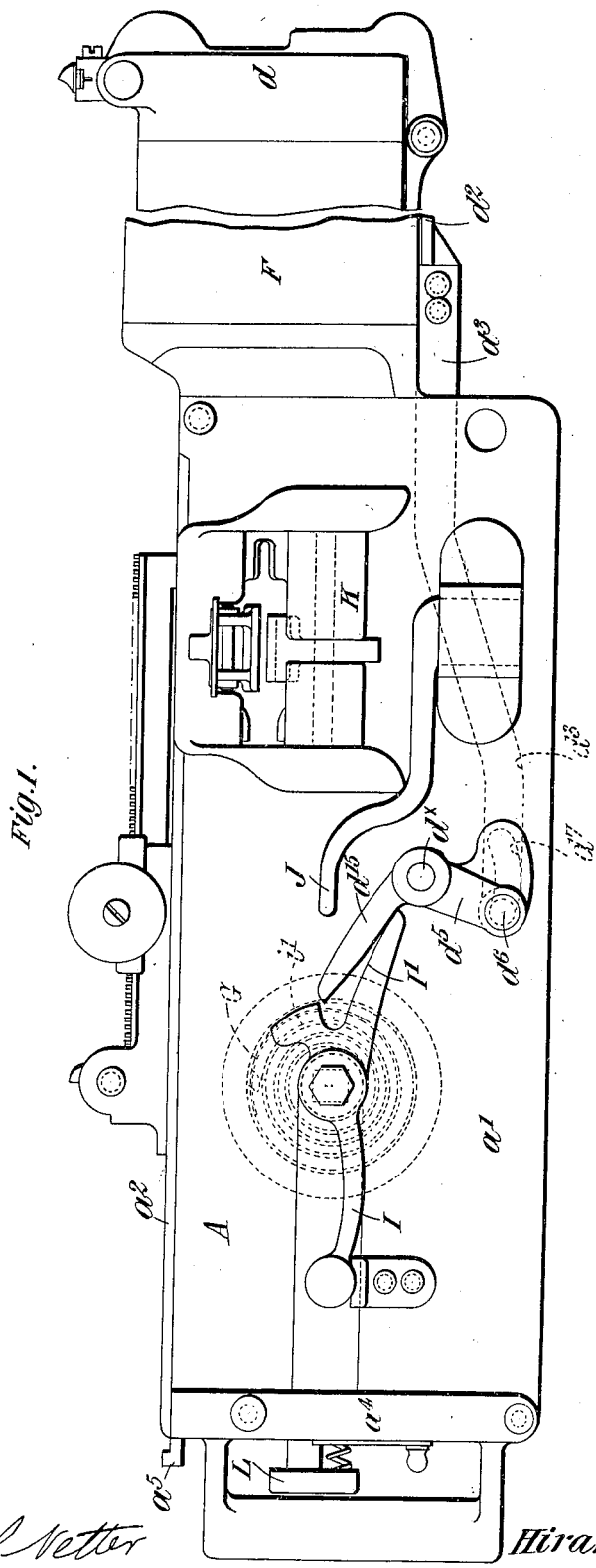

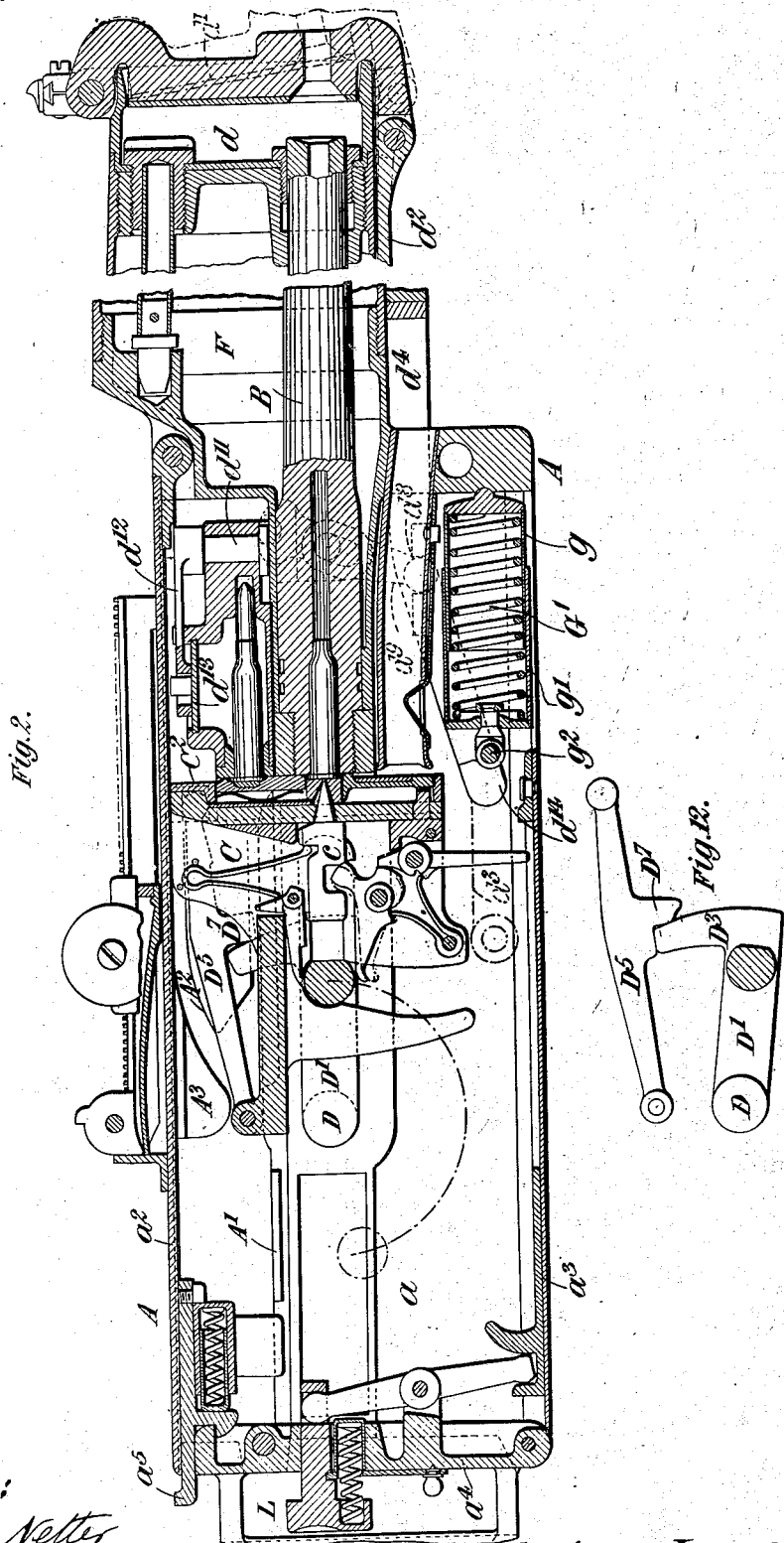

(No Model.)  6 Sheets—Sheet 3.
H. S. MAXIM.
GAS OPERATED GUN.
No. 586,362.  Patented July 13, 1897.
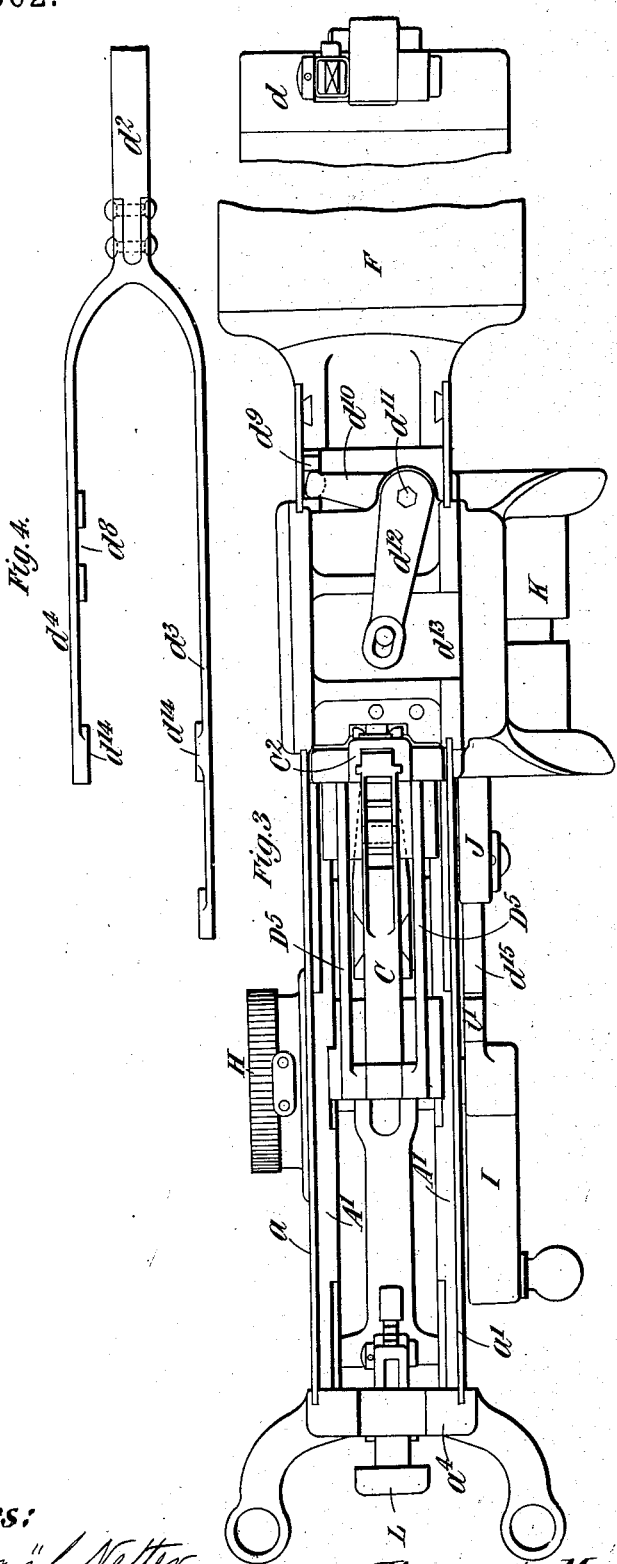
Witnesses:
Raphaël Netter
Edwin B. Hopkinson.
Hiram S. Maxim, Inventor
by Kerr, Curtis & Page Att'ys.

(No Model.)  6 Sheets—Sheet 4.

H. S. MAXIM.
GAS OPERATED GUN.

No. 586,362.  Patented July 13, 1897.

Witnesses:
Raphael Netter
Edwin B. Hopkinson.

Hiram S. Maxim, Inventor
by Kerr, Curtis & Page, Att'ys.

(No Model.) 6 Sheets—Sheet 5.
H. S. MAXIM.
GAS OPERATED GUN.
No. 586,362. Patented July 13, 1897.
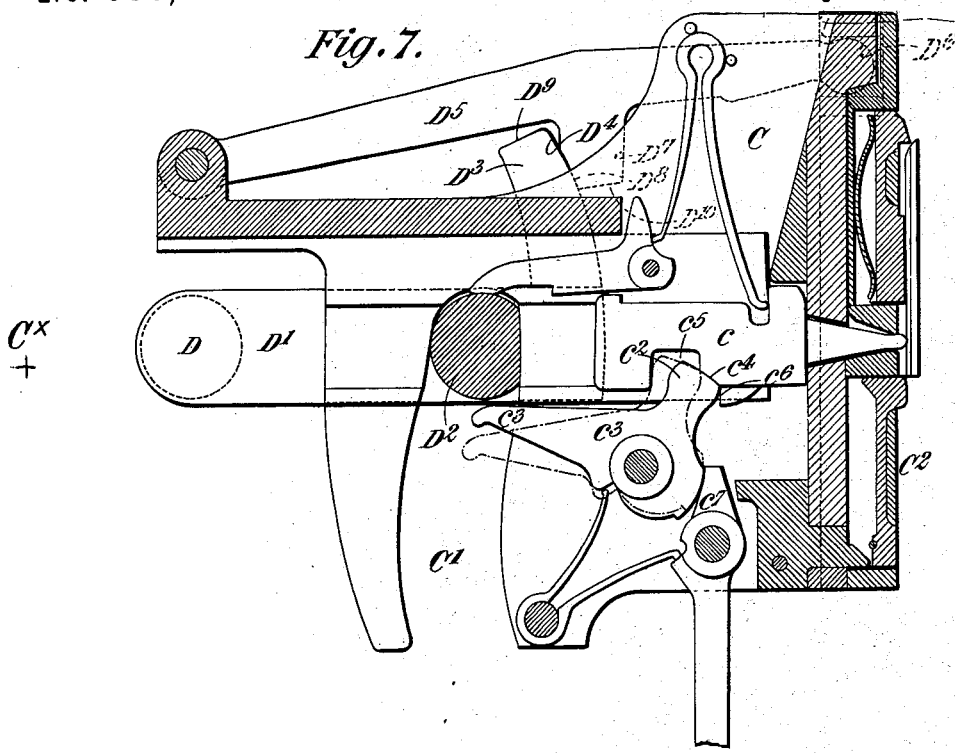
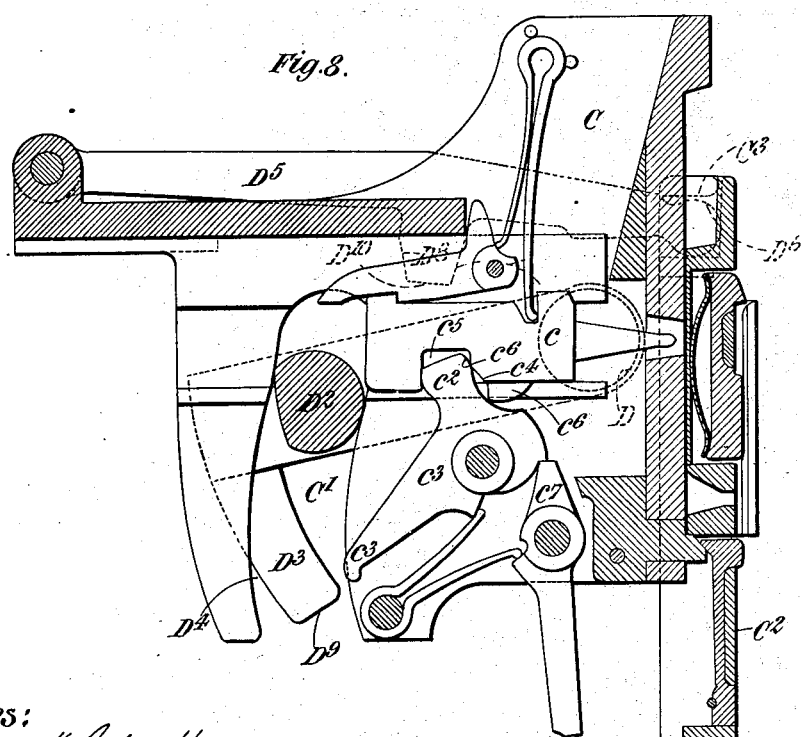
Witnesses:
Raphael Netter
Edwin B. Hopkinson
Hiram S. Maxim, Inventor
by Kerr, Curtis & Page Attys (No Model.) 6 Sheets—Sheet 6.
H. S. MAXIM.
GAS OPERATED GUN.
No. 586,362. Patented July 13, 1897.
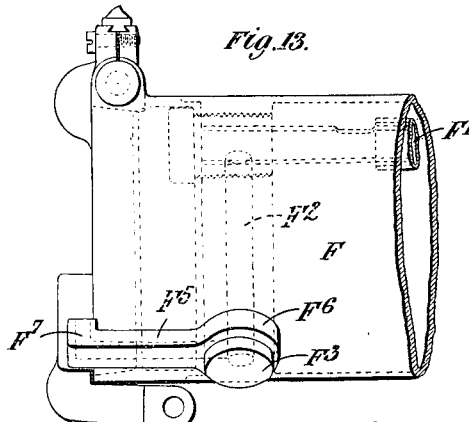
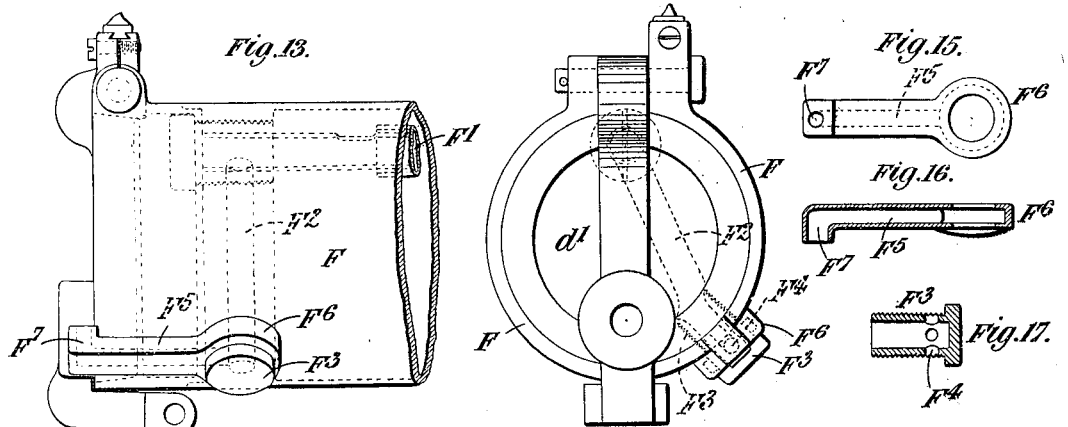
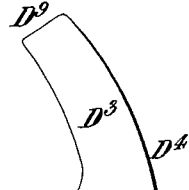
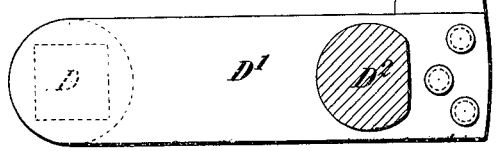
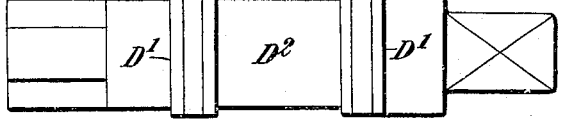
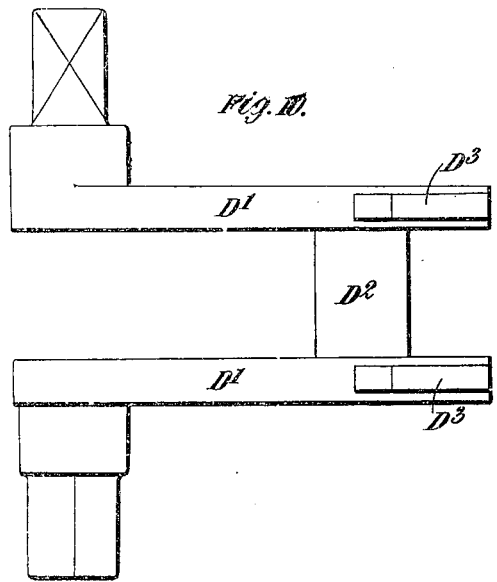
Witnesses:
Raphaël Netter
Edwin B. Hopkinson.
Hiram S. Maxim, Inventor
by Kerr, Curtis & Page Att'ys

UNITED STATES PATENT OFFICE.

HIRAM STEVENS MAXIM, OF LONDON, ENGLAND, ASSIGNOR TO THE MAXIM-NORDENFELT GUNS AND AMMUNITION COMPANY, LIMITED, OF SAME PLACE.

GAS-OPERATED GUN.

SPECIFICATION forming part of Letters Patent No. 586,362, dated July 13, 1897.

Application filed September 29, 1896. Serial No. 607,316. (No model.)

*To all whom it may concern:*

Be it known that I, HIRAM STEVENS MAXIM, mechanical engineer, a citizen of the United States, residing at 18 Queens Gate Place, London, in the county of Middlesex, England, have invented certain new and useful Improvements in Automatic Guns, of which the following is a specification, reference being had to the accompanying drawings.

This invention relates more particularly, although not exclusively, to that class of automatic guns in which a non-recoiling barrel is employed, and in which the breech mechanism is actuated by the gases of discharge as they escape from apertures formed in the barrel near the muzzle or from the muzzle itself and enter a gas-chamber to act upon a movable contrivance, such as a hinged flap, situated at the muzzle of the gun.

According to my present invention I provide the gun with a firing-pin which, although it may be of considerable diameter, will not be blown backward at the instant of firing, the said firing-pin being so arranged that it is locked in its fired position, but is unlocked again after the gun has been discharged. By these means I am able to overcome the trouble that has been experienced on account of the primers of the cartridges being unable to withstand the very high pressure they experience on firing, the primers having been sometimes forced out of the cartridges or having had holes blown through them.

Instead of using a toggle-joint action for actuating the breech block or lock I now provide the crank with a pin working in a slot in the lock-body, the said slot being so formed and arranged that the lock moves forward but slightly during the last portion of the angular movement of the crank in closing the breech. The said crank is also provided with incurved horns which are so disposed with relation to lifting-levers connected to the cartridge-carrier that the latter is lifted into its elevated position and there locked, the lock then performing the slight forward movement above mentioned by the crank-pin rising in the slot and pushing the lock forward against the breech end of the barrel. The upper portion of the said slot is advantageously struck from a center slightly below the center about which the crank turns. In this manner all the lost motion is taken up and the lock is very firmly held in position at the instant of firing, which prevents the breakage of cartridge-cases.

The crank-handle is rotated by a bell-crank lever which is connected to a rod passing from the before-mentioned hinged flap. The bell-crank lever is arranged in such a manner that it first gives a relatively slow rotation to the crank and accelerates the movement thereof by gradually acting on the crank nearer to its center and farther from the center of the bell-crank lever. The bell-crank lever is brought to a state of rest without shock, at the same time giving a strong rotary motion to the crank-handle and all its attachments. I provide a projection on the crank-handle which is arranged in such a manner relatively to the bell-crank lever that when the crank-handle is once started it prevents the said bell-crank lever from prematurely returning into the firing position and forcing the cartridge into the feed-box too early, the parts not being allowed to return until after the cartridge has been completely drawn from the belt. This prevents crowding of cartridges in the feed-box.

In this gun if the cartridge-belt should catch in the box or be prevented from moving freely the crank-handle cannot return into the firing position until after the bell-crank lever has been pushed back into the firing position and a new cartridge fed into position in the feed-box.

In order to keep the aforesaid flap from becoming overheated, the water-jacket is provided with an outlet that lies adjacent to the flap and is so arranged that the steam and water that escapes from the jacket can impinge upon the flap and enter the gas-chamber each time the flap opens.

I will now proceed to describe my improved gun with reference to the accompanying drawings, in which—

Figure 6:
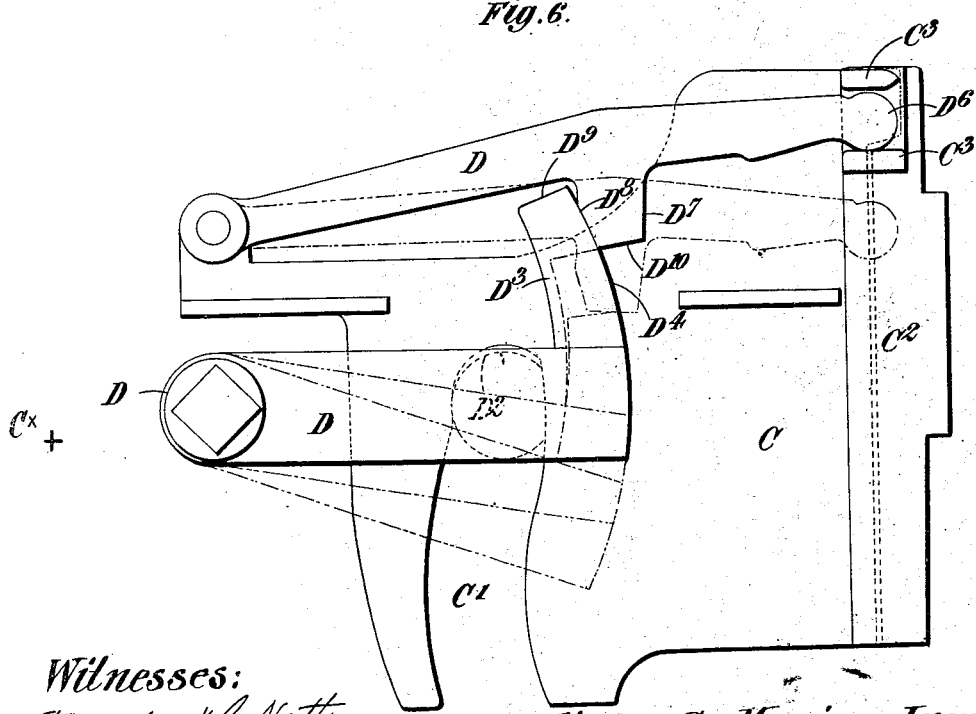

Figure 1 is an elevation of the right side of the gun with a portion of the water-jacket broken away. Fig. 2 is a vertical longitudinal section of the same, and Fig. 3 is a plan with the cover-plate of the casing inclosing the breech mechanism removed. Fig. 4 is a plan of the inner end of the rod by which the movement of the hinged flap is conveyed to the breech mechanism. Fig. 5 is a detail view showing the crank-handle and bell-crank lever seen in Fig. 1 in other positions. Fig. 6 is a side elevation of the breech-block on a larger scale. Fig. 7 is a vertical section of the breech-block (also on a larger scale) with the parts thereof in the position they occupy when the breech is fully closed and the gun fired. Fig. 8 is a similar view but with the parts in the position they occupy when the breech is fully opened and the firing-pin "cocked." Figs. 9, 10, and 11 show, respectively, a longitudinal section, a plan, and an end elevation of the crank employed in this construction of gun. Fig. 12 is a fragmentary view showing a slightly-modified construction of the lifting-levers and crank-arms for operating them. Fig. 13 is a side elevation, and Fig. 14 an end view, of the muzzle portion of the gun with the device for preventing the flap from becoming overheated applied thereto. Figs. 15 and 16 are respectively an inside face view and a longitudinal section of the outlet portion of the device. Fig. 17 is a longitudinal section of a plug by which the said outlet is connected to the passage leading from the water-jacket.

Like letters of reference indicate similar parts in all the figures.

A is the casing that incloses the breech mechanism, the said casing consisting of the side plates $a\ a'$, the top and bottom plates $a^2\ a^3$, and the end plate $a^4$.

$a^5$ is the spring-catch for retaining the top plate or cover closed.

B is the barrel.

C is the breech block or lock.

A' A' are the guide-plates in which the breech block or lock reciprocates.

D is the crank-shaft; D', the crank; F, the water-jacket; G, the spring which acts to return the crank to its firing position; H, the box or casing inclosing this spring; I, the crank-handle; J, the buffer-spring against which the crank-handle strikes in its forward movement; K, the roller over which the cartridge-belt passes as it enters the gun, and L the firing-button.

$d$ is the gas-chamber at the muzzle of the gun, and $d'$ the hinged or pivoted flap closing this chamber.

$d^2$ is a rod which extends along the under side of the water-jacket and has its inner portion bifurcated or formed with two arms $d^3\ d^4$. One of these arms—viz., $d^3$—engages with the lower limb $d^5$ of a bell-crank lever that is pivoted at $d^\times$ on the exterior of the gun, this connection being effected by a pin $d^6$, which extends through a curved slot $d^7$ in the side plate $a'$. The other of the said arms— viz., $d^4$—is provided with a recess $d^8$, into which enters the lower end of an oscillatory lever $d^9$. (Shown in dotted lines in Fig. 2.) The upper end of this lever is forked to engage with an arm $d^{10}$, projecting from the axis $d^{11}$, carrying the feed-lever $d^{12}$. This feed-lever operates the feed-plate $d^{13}$, by which the cartridge-belt is fed through the gun in the well-known manner.

G' is a spiral spring inclosed in telescopic tubes or shells $g\ g'$, the former abutting against a fixed portion of the gun and the latter carrying a transverse bar $g^2$, whose ends engage with recesses formed in the thickened portions $d^{14}$ of the bifurcated part of the rod $d^2$. This spring becomes compressed when the flap moves outwardly and by its reaction returns the said flap to its shut position.

Rotary movement is imparted to the crank by means of the aforesaid bell-crank lever, the limb $d^{15}$ of which acts on the curved surface I' of the crank-handle I. In order that the bell-crank lever shall not prematurely return to the firing position after it has imparted motion to the crank-handle, I provide the said crank-handle with a projection $i'$, which is so arranged that as the end of the limb $d^{15}$ of the bell-crank lever acts on the curved portion I' of the crank-handle to turn the latter the aforesaid projection $i'$ arrives above the outer end of the said limb $d^{15}$, (see Fig. 5,) so that in the event of the bell-crank lever at this time attempting to return to the firing position this projection $i'$ will act as a stop to retard its return and will not release it until the crank-handle has assumed approximately the position represented by the dotted lines in Fig. 5. By these means the oscillatory lever $d^9$ is prevented from being operated by the rod $d^2$ and from actuating the cartridge-feed plate $d^{13}$ before a cartridge has been completely withdrawn from the belt. Crowding of the cartridges in the feed-box is thereby avoided. Moreover, if for any reason the cartridge-belt should be prevented from moving freely through the feed-box or become fixed therein, so that the limb $d^{15}$ of the bell-crank lever cannot with facility resume the firing position, this limb will retard the return movement of the crank-handle until the said limb has regained its firing position and until a new cartridge has been fed into proper position in the feed-box.

Instead of employing a toggle-joint action for operating the breech-block, as in many of my previously-constructed guns, I form the lock-body with a curved slot C', in which the crank-pin D² works, the curvature of this slot being, as already stated, such that when the said crank-pin is moving in the upper part thereof—that is to say, during the last portion of the angular movement of the crank in closing the breech—the breech-block moves only to a slight extent. The cartridge-carrier C² here shown is similar to the well-known kind used in previously-constructed Maxim guns and receives a vertical movement on the breech-block as the latter reciprocates during the working of the gun. The means employed for lifting the cartridge-carrier and locking it in its raised position just before the completion of the closing movement of the breech-block are, however, modified in construction as follows: The crank D' is provided with curved pieces or horns $D^3$ $D^3$, whose outer curved surfaces $D^4$ are arcs of circles described from the center of the crank-shaft D. (See Figs. 6, 7, and 9.) Pivoted to the rear portion of the breech-block is a pair of levers $D^5 D^5$, whose outer or front ends $D^6$ engage with lugs $C^3$ on the cartridge-carrier. Extending downwardly from the under side of each lever $D^5$ is a projection $D^7$, the inner portion $D^8$ of which is curved in correspondence with the curvature of the surfaces $D^4$ of the horns $D^3$. Therefore while the parts are in the position represented by Figs. 6 and 7 the aforesaid lifting-levers $D^5$ are firmly held raised and the carrier $C^2$ is locked in its elevated position. These parts remain in their locked position until, by the movement of the crank in opening the breech, the upper ends $D^9$ of the horns $D^3$ come in alinement with the lower surface $D^{10}$ of the projection $D^7$. The lifting-levers are then no longer held in their locked position by the horns $D^3$ and can therefore turn downwardly about their pivots when the carrier is depressed by the action of the ordinary cams $A^2$ on the inner surface of the frame A and bracket $A^3$ within the gun. During the return movement of the breech-block to close the breech and as the crank-pin $D^2$ is approaching the upper portion of the slot C' the end $D^9$ of each of the horns $D^3$ strikes against the under side $D^{10}$ of each of the projections $D^7$ on the lifting-levers $D^5$, as shown by the dotted lines in Fig. 6, whereby the lifting-levers are raised and the carrier elevated. The crank, continuing its movements, causes the curved surface of the horns $D^3$ to slide against the curved surface $D^8$ of the projections $D^7$ without imparting further movement to the lifting-levers, but firmly locking them and the cartridge-carrier in their elevated position, so that all movement of the said carrier is completed before the final closing of the breech.

Instead of making the under sides $D^{10}$ of the projections $D^7$ flat, as shown in Figs. 1, 6, and 7, they may be made curved at that part where the corners of the horns $D^3$ work against them, as shown in Fig. 12. In this case also the ends $D^9$ of the said horns are adapted to lie in contact with the under side of the lifting-levers.

The upper portion of the aforesaid curved slot C' is advantageously struck from a center at $C^x$, Figs. 6 and 7, which is somewhat below the center about which the crank turns. In this manner all lost motion is taken up and the breech-block is very firmly held in position at the instant of firing. The breakage of cartridge-cases is thereby avoided.

In order to lock the firing-pin c in its fired position, the nose $c^2$, Figs. 7 and 8, of the cocking lever or hammer $c^3$ is curved, and the portion $c^4$ of a recess $c^5$ in the firing-pin is likewise curved, so that when the said firing-pin is impelled forward by the hammer to fire a cartridge the aforesaid nose $c^2$ occupies the position represented by the full lines in Fig. 7 and lies against a shoulder $c^6$ on the firing-pin. The firing-pin is thus locked in its forward position until the crank-pin $D^2$, during its downward movement in the slot C', acts upon the tail $c^3$ of the hammer, the said crank-pin first bringing it into the position represented by dotted lines in Fig. 7, and finally into the cocked position shown in Fig. 8, in which position it is held by the firing-sear $c^7$.

Referring now to Figs. 13 to 17, F' is the pipe within the water-jacket, through which the steam and water pass to a transverse passage $F^2$. The outer end of this passage opens into a hollow screw-plug $F^3$, having radial holes $F^4$ in its walls, as best seen at Fig. 17. $F^5$ is a conduit which is formed with a cylindrical portion $F^6$, that fits around the plug at the part where the said radial holes are formed, the said conduit being firmly held in place by being pressed against the water-jacket by the head of the plug $F^3$ when the latter is screwed up tightly. The outer end of the conduit has a right-angled bend $F^7$, which lies in proximity to the flap, so that as the steam and water escape through the said bend they are directed onto the flap.

What I claim is—

1. In an automatic gun the combination with a movable breech-block and a firing-pin sliding therein, of a cocking-hammer engaging directly with said firing-pin and acting as a strut therefor when the pin is in its fired position.

2. In an automatic gun, the combination with a reciprocating breech-block and the crank for operating it, of a firing-pin having a recess formed with an inclined shoulder and a cocking-hammer having a nose engaging with said recess and lying behind the said inclined shoulder so as to act as a strut when the firing-pin is in its fired position, as set forth.

3. In an automatic gun, the combination with a reciprocating breech-block and the crank for operating it, of a firing-pin having in its under side a recess provided with a curved shoulder, and a pivoted cocking-hammer having a nose engaging with said recess and a surface curved to correspond with and abutting against the curved shoulder on the firing-pin when the latter is in its forward or fired position and acting as a strut therefor, as set forth.

4. In an automatic gun, the combination with a reciprocating breech-block and a crank for operating the same, of a firing-pin having a recess in its under side provided with a curved shoulder, of a pivoted cocking-hammer having a nose engaging with the said recess and a curved portion abutting against the curved shoulder on the firing-pin when the latter is in its forward or fired position, and serving as a strut therefor, and a tail lying in the path of the crank, whereby the hammer is cocked, as set forth.

5. In an automatic gun the combination with a reciprocating breech-block and the crank for operating it, of a pair of pivoted lifting-levers engaging at their free ends with the sliding cartridge-carrier, of projections extending downwardly from such lifting-levers and having curved surfaces thereon, of curved horns on the crank for engaging with the curved surfaces on the aforesaid projections, and of a crank-pin working in a curved slot in the breech-block, substantially as described and for the purpose specified.

6. In an automatic gun provided with a reciprocating breech-block, a crank, and a gas-chamber into which the gases of discharge enter to actuate a movable portion of the gas-chamber; the combination with the said movable portion of a bifurcated rod, one member of which is connected to a bell-crank lever adapted to act on the crank, and the other member of which is coupled to an oscillatory lever that actuates the cartridge-feed device, and of a projection on the crank-shaft, which is adapted to operate in conjunction with the crank-actuating limb of the bell-crank lever so that in the event of the said bell-crank lever attempting to return to the firing position before a cartridge has been completely withdrawn from the belt by the cartridge-carrier the said crank-actuating limb of the bell-crank lever will be stopped by the aforesaid projection substantially as described.

7. In an automatic gun provided with a reciprocating breech-block, a crank, a gas-chamber into which the gases of discharge enter to actuate a movable portion of said gas-chamber and a rod for transmitting the movement of the said movable portion of the gas-chamber to the breech mechanism; the combination with the said rod of a spring inclosed in a telescopic casing, one portion of said casing being connected to the aforesaid rod and the other portion bearing against the framing of the gun, substantially as described.

8. In an automatic gun provided with a water-jacket and a gas-chamber into which the gases of discharge enter and actuate a movable portion of the said chamber to operate the breech mechanism; the combination with said chamber of a conduit extending from a transverse passage communicating with the steam-pipe of the water-jacket and having an exit-opening in proximity to the said movable portion, so that the steam and water escaping from the water-jacket are directed onto the movable portion substantially as described and for the purpose specified.

In testimony whereof I have hereunto set my hand this 4th day of September, 1896.

HIRAM STEVENS MAXIM.

Witnesses:
FRANK C. BRISLEY,
FRED C. HARRIS.